United States Patent [19]

Puretic

[11] 4,175,347
[45] Nov. 27, 1979

[54] STERN FISHING SYSTEM

[76] Inventor: Mario J. Puretic, 259 6th Ave. North, Tierra Verde, Fla. 33715

[21] Appl. No.: 804,748

[22] Filed: Jun. 8, 1977

Related U.S. Application Data

[63] Continuation-in-part of Ser. No. 784,278, Apr. 4, 1977, Pat. No. 4,125,955.

[51] Int. Cl.² .............................................. A01K 81/04
[52] U.S. Cl. ...................................................... 43/6.5
[58] Field of Search ................................ 43/8, 6.5, 14

[56] References Cited
U.S. PATENT DOCUMENTS
1,606,668  11/1926  Rubach ................................... 43/6.5

OTHER PUBLICATIONS

World Fishing, May 1967, "Seining Without Brailing", p. 62.

Primary Examiner—Harold D. Whitehead
Attorney, Agent, or Firm—Fulwider, Patton, Rieber, Lee & Utecht

[57] ABSTRACT

A stern fishing system utilizing a power block and purse seine net which is launched and retrieved from the stern of a fishing boat. When the net has been pursed, it may contain fish such as tuna, as well as a number of porpoises. For ecology reasons, the porpoise should be released unharmed. Such release is accomplished by driving the fishing boat forward so as to cause the edge of the net most aft of the fishing boat to be temporarily submerged permitting the trapped porpoise to leap from the confines of the net and back into the open sea.

6 Claims, 16 Drawing Figures

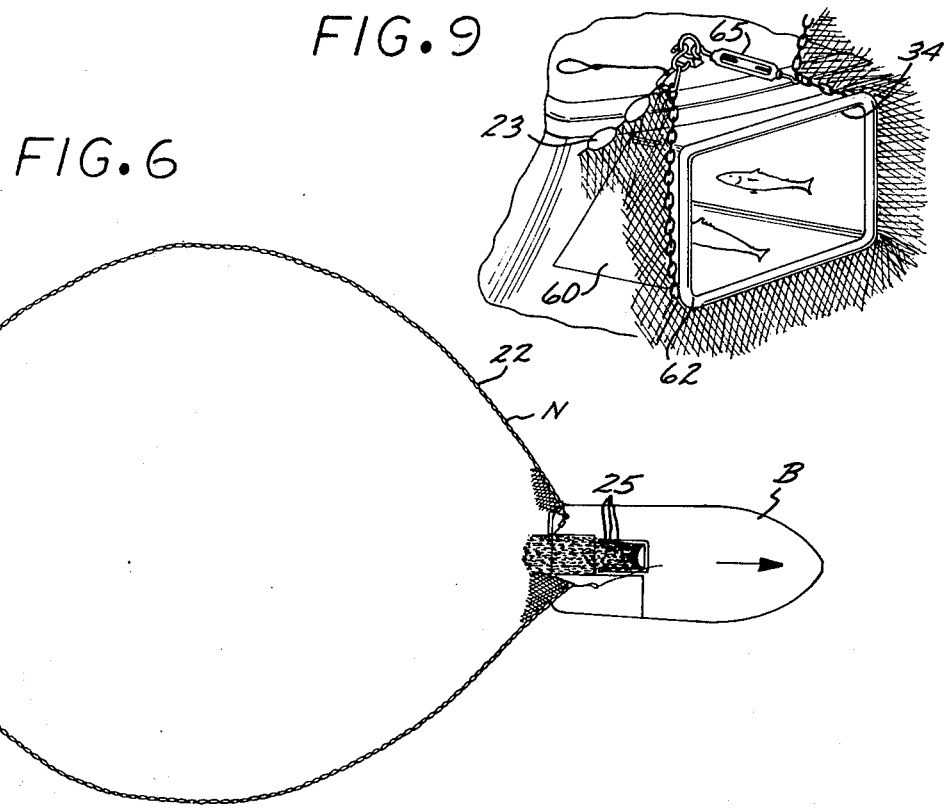

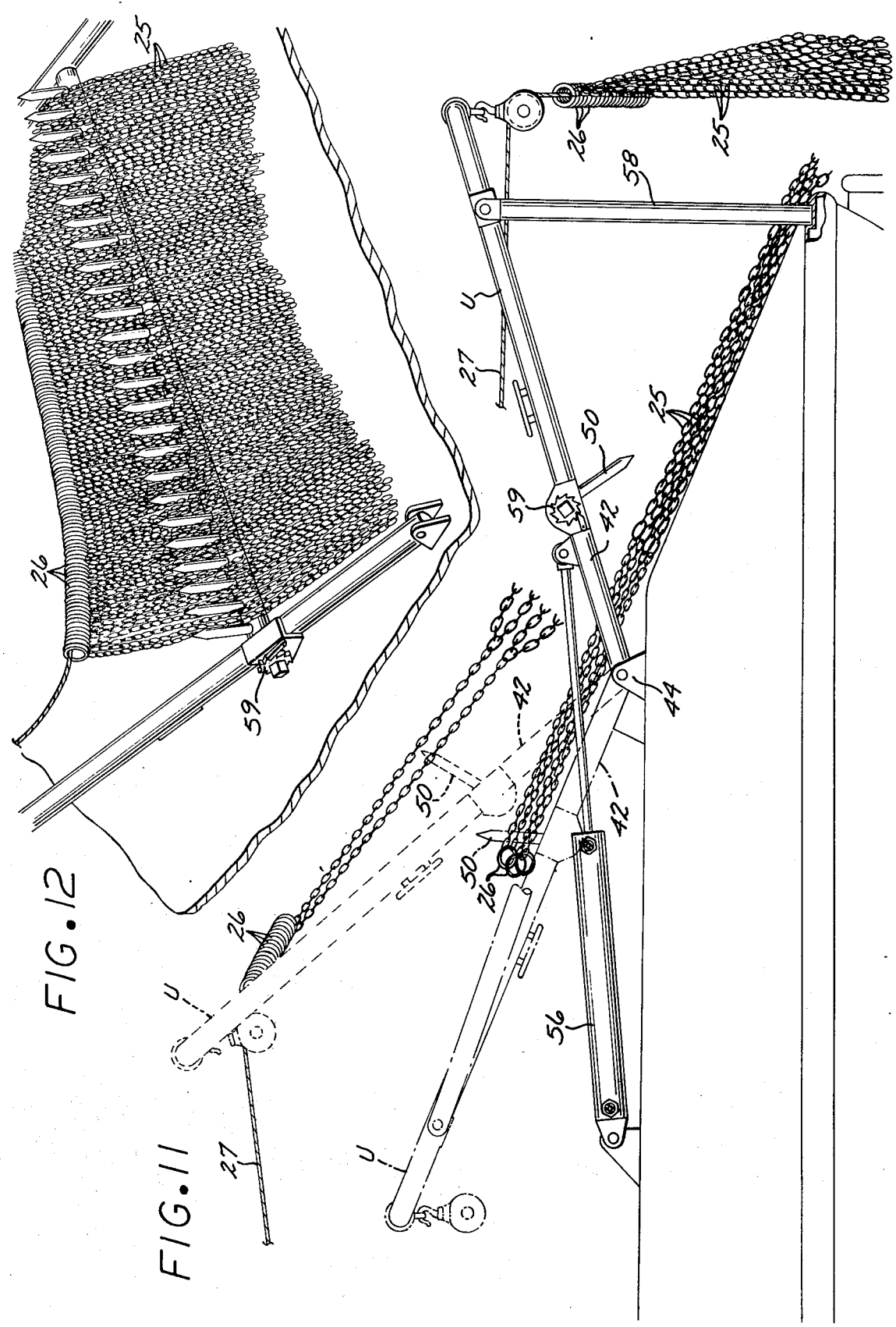

STERN FISHING SYSTEM

CROSS-REFERENCE TO RELATED APPLICATION

This is a continuation-in-part of my patent application Ser. No. 784,278, filed Apr. 4, 1977, now U.S. Pat. No. 4,125,955, issued Nov. 21, 1978.

BACKGROUND OF THE INVENTION

1. Field of the Invention

The present invention relates generally to the art of fishing, and more particularly to a novel stern fishing system utilizing a power block and a purse seine net.

2. Description of the Prior Art

A fundamental and novel advance in the art of fishing is disclosed in my U.S. Letters Pat. Nos. 2,733,530 and 2,733,531, issued Feb. 7, 1956. These patents relate to an apparatus and method for drawing a purse seine net alongside a fishing boat by means of a power block suspended from a boom on the boat. The use of such power block has greatly expedited the hauling-in of the net alongside the boat whereby it has been possible to substantially reduce the number of men required for a commercial fishing boat crew. Although the use of such power block permits the netted fish to be brought alongside the fishing boat in a minimum period of time, certain disadvantages are inherent to the setting and retrieving of the net from the side of the fishing boat.

A particular problem is freeing porpoise trapped in the net with the other fish. It has been proposed that the fishing boat and the bet be maneuvered so as to permit the fishing boat to "back down" relative to the net so as to cause a length of the cork line and hence the upper edge of the net to become temporarily submerged. Trapped porpoise can then leap out of the confines of the net. Such maneuvering, however, is difficult, particularly under rough water conditions and, if not carefully conducted, such maneuvering can cause damage to the net and loss of the netted fish. Additionaly, side fishing places a tremendous strain on the net and the net retrieving gear, particularly under rough conditions where the fishing boat undergoes a rapid roll. A further disadvantage with conventional side fishing lies in the difficulty involved in recovering the fish from the net and transferring such fish into the holds of the fishing boat.

SUMMARY OF THE INVENTION

It is a major object of the present invention to provide a stern fishing system utilizing a power block and a purse seine net wherein the netted fish are rapidly and safely transferred onto a fishing boat, with such system permitting porpoises trapped in the net to escape therefrom unharmed.

A further object of the present invention is to provide a stern fishing system which minimizes the strain placed on the net and the net retrieving gear.

Another object of the present invention is to provide a stern fishing system of the aforedescribed nature wherein the fishing boat is provided with a stern aperture through which netted fish are directly introduced as the net is being retrieved.

An additional object of the present invention is to provide a stern fishing system wherein the stern of the fishing boat is provided with a novel swinging-grabber for the purse rings of the net.

A particular object of the present invention is to provide a stern fishing system of the aforedescribed nature provided with an auxiliary engine to maintain forward boat speed while retrieving the net and removing netted fish. Such auxiliary engine is coupled to a thrust-producing device the intake of which is in communication with the fishing boat's stern aperture whereby such suction assists in retrieving fish from the net. The discharge of such thrust-producing device not only effects forward movement of the fishing boat, but also urges the net away from the stern of the fishing boat.

Yet another advantage of the present invention is that the stern fishing system thereof may be utilized with conventional fishing boats and gear.

Other important objects and advantages of the stern system of the present invention will become apparent from the following detailed description.

BRIEF DESCRIPTION OF THE DRAWINGS

FIG. 6 is a diagrammatic illustration showing the pursed net as it is being retrieved onto the stern of the fishing boat;

FIG. 7 a side elevational view showing the pursed net being towed forwardly so as to permit the escape of porpoise from within the net;

FIG. 8 is a side elevational view showing the pursed net being towed forwardly so as to permit the escape of porpoise from within the net;

FIG. 9 is a fragmentary perspective view in enlarged scale showing a stern aperture which may be utilized with the stern fishing system of the present invention;

FIG. 11 is a side elevational view of a swinging purse ring grabber utilized with the stern fishing system of the present invention;

FIG. 12 is a broken perspective view of said purse ring grabber;

DESCRIPTION OF THE PREFERRED EMBODIMENTS

Figure 1:
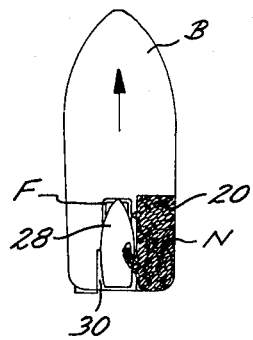
FIGS. 1-4 are diagrammatic illustrations showing a purse seine net being deployed at the start of a fish capturing operation utilizing a preferred form of stern fishing system embodying the present invention.

Referring to the drawings, a preferred form of stern fishing system embodying the present invention is utilized with a fishing boat B provided at its rear portion with a bin 20 wherein a conventional purse seine net N is stored when the fishing boat is underway. The net N is commonly termed a seine net. A seine net of this type includes a float or cork line 22 which as its name implies has a number of corks, floats or other buoyant bodies 23 attached thereto at spaced intervals. An elongated wall or panel of webbing 24 is supported from the cork line 22. The lower edge of the webbing panel 24 is affixed by bridles 25 to a plurality of pursing rings 26. The pursing rings 26 removably receive a purse line 27. The purse line 27 is adapted to have its length reduced so as to "purse" the lower portion of the webbing panel together in a conventional manner. Fishing boat B is provided with a conventional power block P and a conventional deck winch W.

Fishing boat B is operated in conjunction with conventional powered skiff 28. The fishing boat B is provided with a downwardly and rearwardly extending stern ramp 30 whereon is pivotally mounted a novel swigning grabber G for retrieving the purse rings 25 of the net N. Fishing boat B is also provided with a stern aperture 34, shown particularly in FIGS. 9 and 10 that leads forwardly and upwardly from the transom area of the boat B, and through which fish are directly unloaded from the net N as such net is being retrieved.

Figure 10:
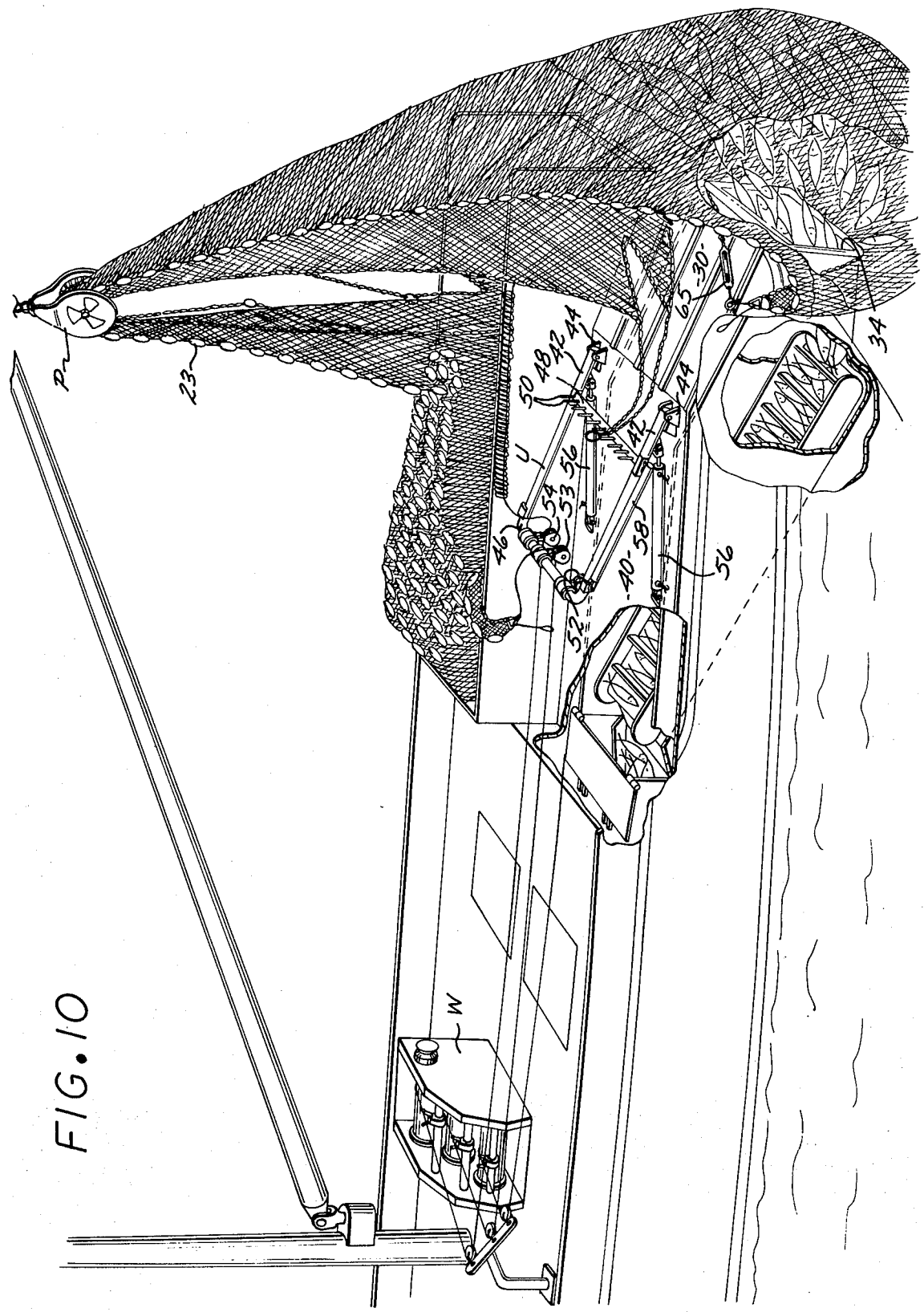
FIG. 10 is a perspective view showing details of the stern fishing system embodying the present invention.
Figure 13:
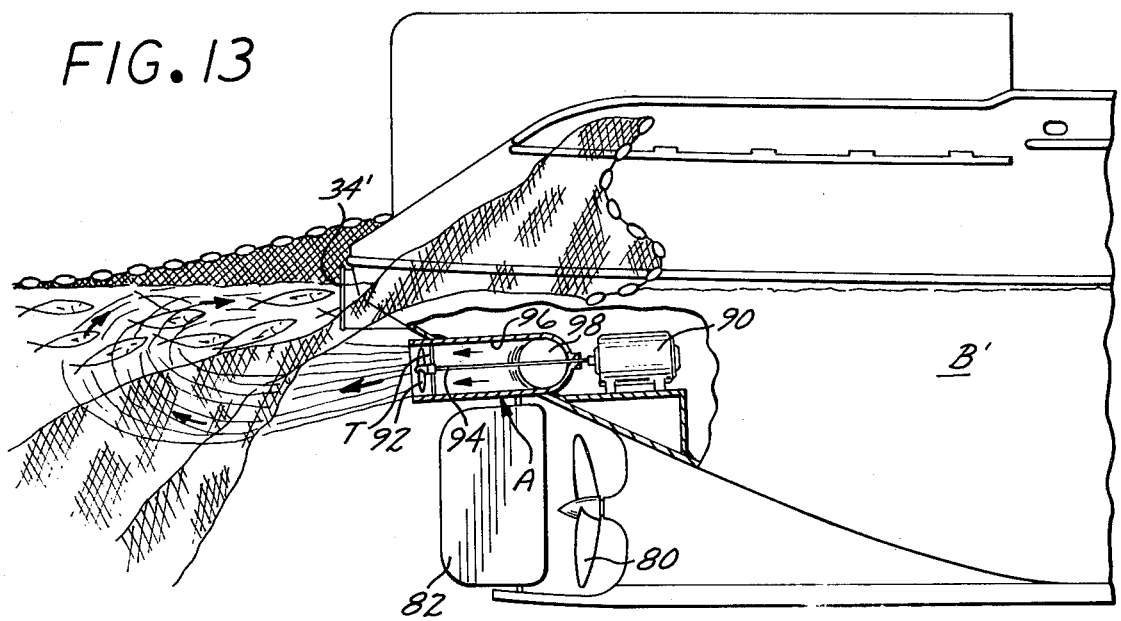
FIG. 13 is a broken side elevational view of an auxiliary propulsion system which may be employed with the stern fishing system of the present invention.
Figure 14:
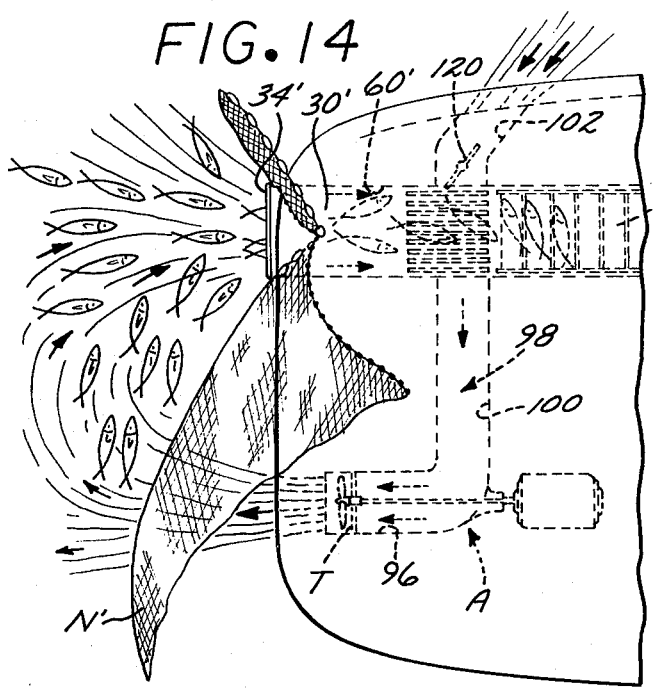
FIG. 14 is a fragmentary top plan view of such auxiliary propulsion arrangement.
Figure 15:
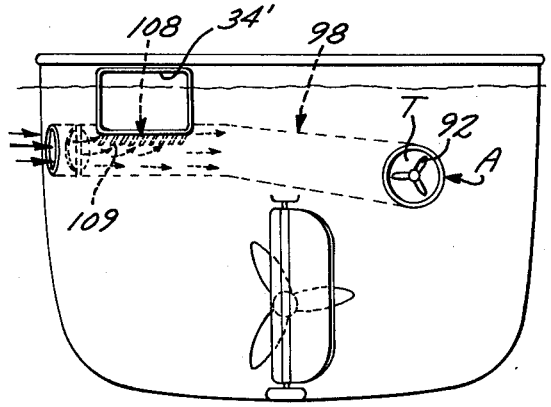
FIG. 15 is a rear view of such auxiliary propulsion arrangement.

More particularly, the upper end of stern ramp 30 merges into a generally horizontal platform 40 whereon is mounted the purse ring grabber G. Referring particularly to FIG. 10–12, ring grabber G includes a generally U-shaped frame, with the free ends of the legs 42 thereof being pivotally supported within brackets 44 secured to the platform 40. The distal ends of the lgs 42 are bridged by a crosspiece 46. The intermediate portions of legs 42 are affixed to the opposite sides of a crossbar 48 which carries a plurality of purse ring-receiving prongs 50. The crosspiece 46 supports three like blocks 52, 53 and 54. Ring grabber G is swingably movable fore and aft between an initial forwardly and upwardly extending position shown in FIG. 10, and a rearwardly extending position shown in solid outline in FIG. 11 by means of a pair of pivotally mounted power cylinders 56. Such power cylinders may be air or hydraulically actuated in a conventional manner. With the ring grabber G in its rearward position, its elevation will be maintained by a pair of support rods 58 having their upper ends pivotally secured to the legs 42. Preferably, crosspiece 46 and hence the angle of prongs 50 may be adjusted by means of a conventional pinion and latch mechanism 59 shown particularly in FIG. 12. With this arrangement, prongs 50 may be pivoted forwardly so as to avoid contact with the underside of skiff 28. Also, the angle of such prongs can be varied so as to facilitate movement of purse rings 26 relative thereto.

The stern aperture 34 is defined by the rear end of a generally rectangular, longitudinally extending tunnel 60 formed on the hull of boat B. Such aperture is surrounded by an extended lip 62. A power-operated conveyor 64 is disposed within tunnel 60 and may be of the type shown in my U.S. Letters Pat. No. 3,091,880, issued June 4, 1963. Such patent is also directed to a stern fishing arrangement. The upper end of the conveyor 64 is in communication with a fish chute 66 (FIG. 10) that leads to the interior of the boat B for transfer of the fish holds thereof (not shown). A pivoted water-right gate 70 is provided at the aft end of fish chute 66.

Figure 2:
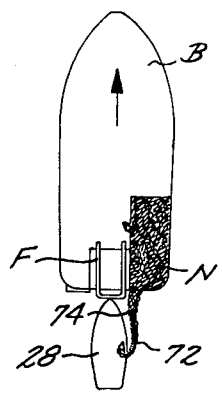

In the operation of the aforedescribed stern fishing system, the fishing boat B will proceed to the fishing grounds with the skiff 28 and net N arranged as shown in FIG. 1, i.e., the skiff rests upon the stern ramp 30 with its underside in abutment with the forwardly and upwardly extending ring grabber G, and with the net N contained within bin 20. When the boat B reaches the school of fish, the skiff 28 is launched off the stern ramp 30. The ring grabber G may be caused to swing towards its aft position to assist in the launching of the skiff. In FIG. 2, the skiff 28 has been launched, and it will be noted that one end of the net N is attached to such skiff together with one end of cork line 22 and purse line 26. As Indicated in FIG. 10, the opposite end of net N remains within the bin 20.

Figure 3:
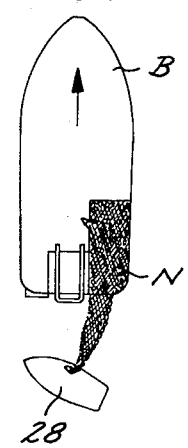
Figure 4:
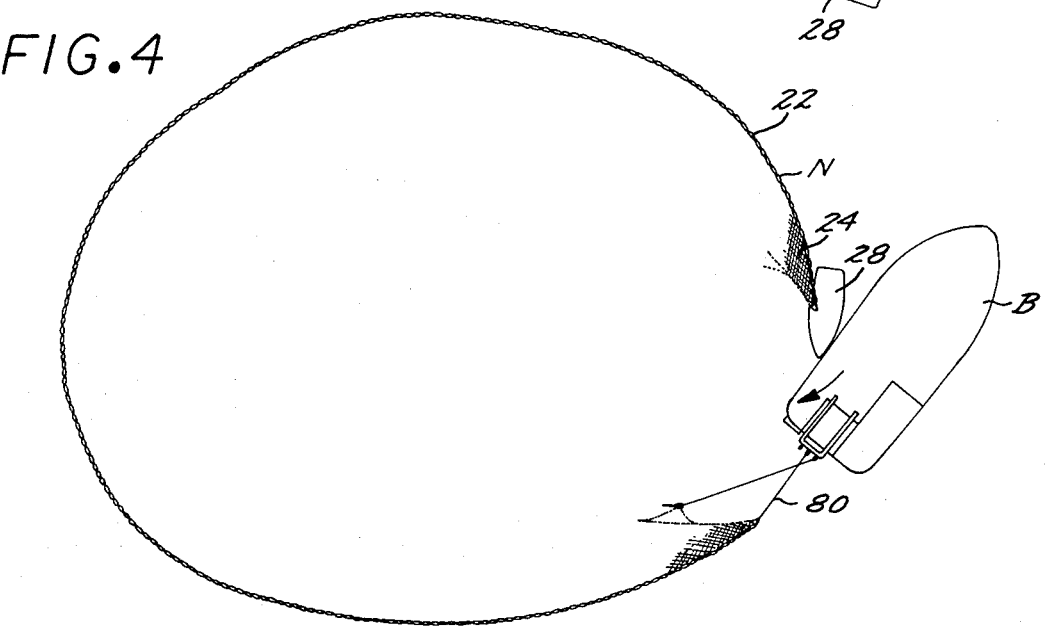

Referring now to FIGS. 3 and 4, the skiff 24 lies idle in the water and the fishing boat B powers away therefrom. During such movement of the boat B, the net N plays out of the bin 20. The fishing boat B proceeds in a generally circular path relative to the idle skiff 24 until the net N has been encircled about a suspected school of fish. When the end of net N carried by the fishing boat B has been played out, a cork tow line 80 is attached to the end of the cork line 22 and purse line 27 is likewise let out so as to permit the end of the net N carried by the boat B to trail behind the boat as the boat completes the net laying operation. This minimizes the danger of entangling the boat and the net.

Figure 5:
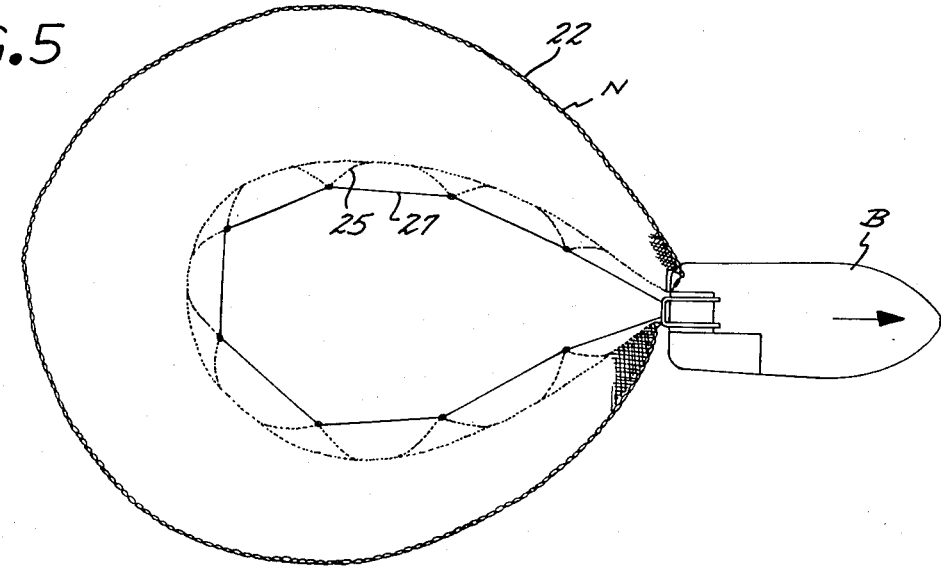
FIG. 5 is a diagrammatic illustration showing the net being pursed.

Referring now to FIG. 5, the cork tow line 90 has been retrieved and both ends of the purse line 27 have been winched insofar as to begin the closing of the lower portion of the net. It is important to note that during the net setting and pursing operation, the ring grabber G is disposed in its rearwardly extending position shown in FIG. 12 in solid outline.

Referring now to FIG. 10, the opposite ends of the purse line 27 extend through blocks 53 and 54 to the aforementioned deck winch W. The cork tow line 80 extends through block 52 to the same winch. When the end of the net, which was initially secured to the skiff 28, is drawn adjacent the transom of the boat B, such net end is secured around the lip 62 of the stern aperture 34 by means of a turnbuckle 65, as shown in FIG. 9.

After the purse line 27 has been pursed, the rings 26 will be arranged as shown in solid outline in FIG. 11, i.e., such rings 26 and bridles 25 will be disposed adjacent the free end of the rearwardly extended ring grabber G. Thereafter, the ring grabber G will be swung forwardly by means of the power cylinders 56, as shown in dotted outline in FIG. 11, assisted, if necessary, by a line (not shown) extending from the crosspiece 46 to the winch W. With continued reference to FIG. 11, and also to FIG. 12, as indicated by the phantom outline showing of the ring grabber G in this figure, once the ring grabber G has been swung to its forwardly and upwardly extending position, the purse rings 26 will be disposed forward of the prongs 50. The ends of purse line 27 are then slacked off, whereby the rings 26 will abut the prongs 50. With the rings 26 so abutting such prongs, the ring bridles 25 and hence net N will be securely retained to boat B and the purse line 27 can be withdrawn from the purse rings 26.

Power block P may then be actuated so as to progressively raise and gather the net N for stacking same within the confines of bin 20. As the net N is progressively raised and gathered, the purse rings 26 will progressively be lifted from contact with the prongs 50 and conveniently may be stowed along the bin 20.

While net N is being progressively raised and gathered by the power block P, fish contained therewithin will be progressively urged into stern aperture 34 and onto the lower portion of the conveyor 64. Such fish will be moved forwardly and upwardly by the conveyor 64 through the tunnel 60 until such fish fall onto the fish chute 66 for transfer into a fish hold. Movement of the fish into the stern aperture 34 is facilitated by the buoyant condition of the fish, inasmuch as the stern aperture 34 is below the water level. Moreover, since the fish are emptied from the net N in a gradual manner rather than being jammed together, the danger of injuring the fish is minimized.

It is an important feature of the present invention that porpoise trapped within net N with the tuna or other fish which are to be retained, may be readily freed from such net without injury. Thus, referring to FIG. 7, with the net N partially or fully pursed, the tuna or other fish normally move towards the lower confines of the net. The porpoise, on the other hand, normally swim in the upper confines of the net. In order to permit the porpoise to escape, it is only necessary to power the fishing boat B forwardly by its main engine whereby the aft portion of the cork line 22 and hence, the net N, will be temporarily submerged, as indicated in FIG. 8. Upon such submergence of the net, the porpoise are free to escape. The tuna or other fish, however, will tend to remain within the net since they will continue to swim at an elevation lower than that to which the net N is submerged. Ater the porpoise have escaped, the speed of the fishingboat will be reduced and the cork line will bring the net up to its normal position.

It should also be noted that the net N may easily be kept free of boat B by merely moving the boat in a forward direction periodically. It should likewise be noted that maintaining the net N aft of the boat B minimizes the strain on the net N, its associated lines and the net retrieving gear mounted on boat B, as compared to a conventional side fishing arrangement. This is particularly true when fishing under rough conditions. It should likewise be noted that the stern aperture 34 need not be blocked off. Hence, the aperture is always ready for a fish loading operation inasmuch as it need not be ungated. Moreover, utilizing an open stern aperture will not create any adverse navigational problems, nor affect the fishing boat's sea worthiness since the gate 70 is disposed above the water line of the boat.

Referring now to FIGS. 13–16, there is shown an auxiliary propulsion arrangement which may be utilized with the stern fishing system of the present invention. Such auxiliary propulsion unit A is shown installed on a fishing boat B'. Fishing boat B' is provided with a conventional propeller or screw 80 mounted forwardly of a conventional rudder 82. It is to be understood that the propeller 80 is utilized to effect normal propulsion of fishing boat B'. Fishing boat B' is also provided with a stern ramp 30' disposed forwardly of stern aperture 34'. The stern ramp 30' and stern aperture 34' are utilized in conjunction with a net N' and the net-retrieving gear described hereinbefore in conjunction with FIGS. 1–12 in order to move netted fish through the stern aperture 34 forwardly and upwardly along the stern ramp 30 through tunnel 60' by means of a power-operated conveyor 64'. Fishing boat B is also provided with a ring grabber G of the type described hereinbefore; however, such device has been deleted from FIGS. 13–16 in the interest of clarity.

Figure 16:
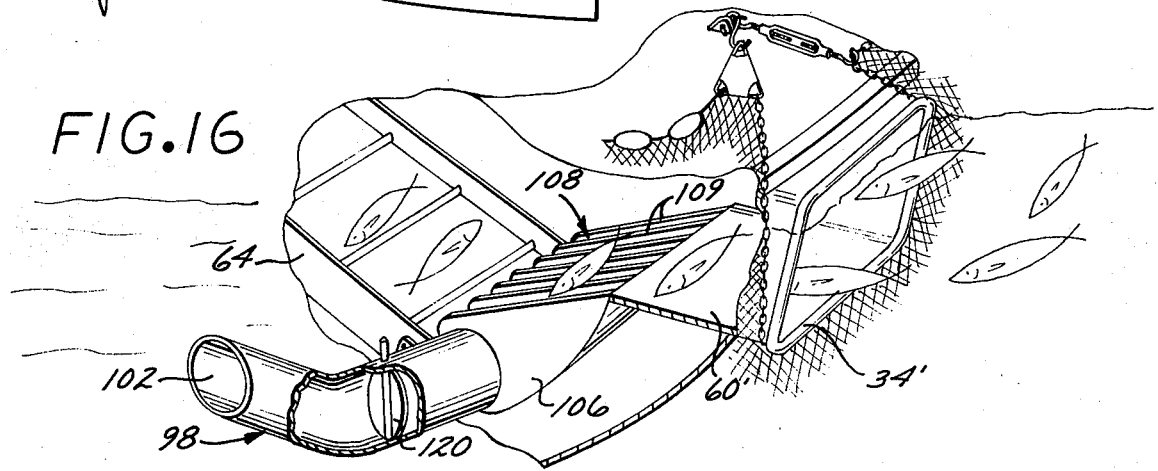
FIG. 16 is a broken perspective view showing how said auxiliary propulsion arrangement assists in drawing netted fish through the stern aperture of the fishing boat.

The auxiliary propulsion unit A is operated to effect forward propulsion of the boat without requiring the use of its main engine and propeller 80. Such auxiliary propulsion unit includes an electric, hydraulic or internal combustion motor 90 which is drivingly connected to a thruster pump T having an impeller 92 by means of a shaft 94. The thruster impeller 92 is positioned at the rear of a longitudinally extending run 96 of a water passage 98. Water passage 98 includes a transverse run 100 and a forwardly angled front run 102. The intermediate portion of passage 98 extends through a generally hemispherical housing 106, the upper end of which is provided with a gravity suction grill 108 positioned forwardly of tunnel 60' and adapted to direct fish onto the lower portion of the power-operated conveyor 64, as shown particularly in FIG. 16. It should be noted that the individual bars 109 of the grill 108 are inclined vertically, along their longitudinal axis, as shown particularly in FIG. 15, so as to create a turbulence in the vicinity of the grill which will assist in reducing any tendency of the fish to gang up atop the grill. Bars 109 also slope downwardly and forwardly as shown in FIG. 16. A butterfly-type damper valve 126 is provided upstream of grill 108 in the run 102 so as to control the quantity of water being pulled through the passage 98. It will be apparent that rotation of the thruster impeller 80 will create a suction below grill 108.

In the operation of the embodiment of the invention shown in FIGS. 13–16, while the net N is being progressively raised and gathered the auxiliary propulsion arrangement will keep the fishing boat B moving slowly forward. It is not necessary at this time to utilize the main engine for propulsion. Hence, a saving in fuel is effected. If, however, it is necessary to temporarily submerge the net to permit trapped porpoise to escape, the main engine may be temporarily engaged with the propeller 80 so as to effect a sharp forward movement of the fishing boat B. After the porpoise have escaped the main engine will be disengaged and the boat driven forwardly solely by the auxiliary propulsion unit A.

Rotation of the thruster impeller 92 not only effects slow forward motion of the fishing boat B', but also serves to maintain the net N' rearwardly and away from the boat, thereby reducing the danger of entanglement of the net with the boat. Inasmuch as the water being directed rearwardly through passage 98 is in communication with the underside of the gravity suction grill 108, the suction pressure of such water will urge fish entering the tunnel 60' towards the rear end of the conveyor 34'. The magnitude of such suction may be controlled by the damper valve 120. Thus, should fish be jammed up atop the grill 108, the butterfly valve 120 may be moved towards a closed position so as to reduce the magnitude of such suction and thereby release the jammed-up fish. It should be further noted with particular reference to FIG. 16 that inasmuch as the bars of the grill 108 slope downwardly and forwardly from tunnel 60', the fish passing thereover will tend to slide downwardly onto the rear end of the conveyor 34'.

Finally, it will be noted that existing conventional fishing boats may be readily modified in order to utilize the stern fishing system of the present invention.

Various modifications and changes may be made with respect to the foregoing detailed description without departing from the spirit of the present invention, for example, the thruster pump T could be utilized with an apeture formed in the side of the fishing boat.

I claim:

1. Fishing apparatus for use with a fishing boat, said apparatus comprising:
    an aperture through which fish are urged;
    a water passage in said boat forwardly of said aperture to receive fish from said aperture;
    a conveyor that receives fish from said water passage;
    a power-driven thruster pump having an impeller disposed in said water passage to direct water passing through said water passage;

with said water passage being in communication with said aperture whereby rotation of said thruster impeller creates a suction pressure within said aperture to urge said fish therethrough;
a suction grill in said water passage over which the fish pass to reach said conveyor;
a valve disposed in said water passage upstream of said impeller to control the magnitude of the suction pressure at said suction grill.

2. Fishing apparatus as set forth in claim 1, wherein said suction grill is defined by bars which slope downwardly toward said conveyor.

3. Fishing apparatus as set forth in claim 1, wherein said water passage includes a longitudinal tunnel that extends forwardly from said aperture to said conveyor, a transverse run that intersects said tunnel adjacent said grill and is open to one side of said boat and connects at its opposite side with the front of a rearwardly extending longitudinal run, the rear of said longitudinal run being open, with said pump being disposed in said longitudinal run and said valve being disposed in said transverse run.

4. Fishing appartus as set forth in claim 3, wherein said suction grill is defined by bars which slope downwardly towards said conveyor.

5. Fishing apparatus for use with a fishing boat, said apparatus comprising:
an aperture formed in the rear of said boat through which fish are urged;
a water passage formed in said boat;
a conveyor that receives fish from said water passage;
a power-driven thruster pump having an impeller disposed in said water passage to direct water passing through said water passage;
a suction grill in said water passage over which the fish pass to reach said conveyor; and
with said water passage including a longitudinal tunnel that extends forwardly from said aperture to said conveyor, a transverse run that intersects said tunnel adjacent said grill and is open to one side of said boat and connects at its opposite side with the front of a rearwardly extending longitudinal run, the rear of said longitudinal run being open, with said pump being disposed in said longitudinal run.

6. Fishing apparatus as set forth in claim 5, wherein said suction grill is defined by bars which slope downwardly toward said conveyor.

* * * * *